United States Patent [19]
Lacroix

[11] 3,907,708
[45] Sept. 23, 1975

[54] MULTI-LAYER SUPPORTED CATALYSTS OF THE PLATINOID FAMILY

[75] Inventor: Roger Claude Lacroix, Suresnes, France

[73] Assignee: Comptoir Lyon-Alemand-Louyot, Paris, France

[22] Filed: Mar. 16, 1973

[21] Appl. No.: 342,087

[30] Foreign Application Priority Data
Mar. 17, 1972 France .............................. 72.09533

[52] U.S. Cl. ............. 252/439; 252/465; 252/466 B; 252/466 J; 252/466 PT; 252/477 R; 423/213.2; 423/213.5
[51] Int. Cl.² ..................... B01J 27/02; B01J 35/00
[58] Field of Search ............. 252/466 B, 466 J, 439, 252/465, 477 R; 423/213.2, 213.5

[56] References Cited
UNITED STATES PATENTS
3,410,651 11/1968 Brandenburg et al. .......... 423/213.2
3,615,166 10/1971 Hindin et al. ................. 252/466 PT

FOREIGN PATENTS OR APPLICATIONS
418,790 10/1934 United Kingdom.............. 423/213.2
662,460 12/1951 United Kingdom.............. 423/213.5

Primary Examiner—W. J. Shine
Attorney, Agent, or Firm—Bacon & Thomas

[57] ABSTRACT

This invention relates to new catalysts in which the support is formed of a metal or a metal alloy, characterized by the fact that they comprise:
a metal support
a layer of at least one metal aluminide of nickel or cobalt of a thickness of from 10 microns to 1mm,
a layer of α-alumina, at least 10 microns thick,
and a least one catalytic surface layer, which may be deposited on an alumina layer of the gamma or eta type; and a process for preparing same.

15 Claims, 5 Drawing Figures

MULTI-LAYER SUPPORTED CATALYSTS OF THE PLATINOID FAMILY

This invention relates to a new catalysts and new catalytic structures which can be used, in particular, to purify the fumes generated by internal combustion engines burning hydrocarbons.

It is known that the unburnt gases resulting from the incomplete combustion of the hydrocarbons are a source of air solution. It is therefore desirable to have a catalyst so that there may be complete combustion of these unburnt gases in the gas from the combustion chambers.

There are, chiefly, two types of catalysts available for this purpose, one being made solely of ceramic material and the other having a support made of metal or of metal alloy. However, such catalysts have not so far given complete satisfaction particularly because of a certain fragility to shock of ceramic catalysts and because of the often prohibitive price of pure metal catalysts.

A recent suggestion has been that compound catalysts should be made comprising a metal support on which is deposited a layer of aluminide, itself covered by a layer of zirconia bearing a catalyst made up of a solution of thorium nitrate and uranyl nitrate to which palladium has been added. These catalysts certainly represent a useful advance in the fields of use referred to above, but they still seem to present some fragility.

The catalysts or catalytic structures that can be used more particularly in the fields referred to above should have the following properties:
- a large surface area in relation to the apparent volume
- as large as possible an area in contact with the fluid to be treated
- it should offer minimum pressure loss to the flow of the fluid
- it should withstand thermal shock
- it should withstand mechanical shock and vibration
- it should withstand corrosion
- it should maintain effective catalytic action over time.

The new catalysts and new catalytic structures to which this invention relates have these properties.

The present invention concerns new catalysts in which the support is formed of a metal or metal alloy characterized by the fact that they comprise:
- a metal support
- a layer of at least one nickel or cobalt aluminide
- a layer of $\alpha$-alumina at least 10 microns thick
- and at least one catalytic surface layer, which may be deposited on a layer of gamma or eta alumina.

The present invention also concerns new catalytic structures characterized by the fact that they are formed of an assembly, in a rigid block, of elements of expanded metal, possibly welded to each other.

The metal support may be formed of any metal or alloy capable of withstanding the operational conditions to which the final product will be subjected. Thus, if these conditions are very severe, it will be preferable to use iron-based metals or alloys or heat-resisting metals including, but not limited to, iron and steels, ferronickels, nickel, chrome-nickels, ferritics or austenitics, stainless steels, and cobalt-chrome or cobalt-nickel-chrome alloys with or without the addition of elements generally found in these metals: Mo, W, Si, C, Ti.

The metal support is covered, at least partly, by a layer of at least one metal aluminide. It is known that these metal aluminides are thermally highly stable combinations of aluminimum with another metal. In the present invention, this other metal will preferably be nickel and/or cobalt, the corresponding aluminides being AlNi and AlCo respectively. It is clearly understood, however, that other aluminides of nickel and/or cobalt are not excluded from the invention, no more than those, less stable and less heat-resistant, of iron and of chrome. Moreover, it frequently happens that these various aluminides are associated when the aluminide layers are produced by the diffusion of aluminium in alloys containing the metals referred to. These aluminide layers are formed on the supports to be covered by the application of known processes such as the cementation or spraying of the said aluminides, in the melted form, onto the said support by means, for example, of a spray gun of the Schoop type, or a plasma torch. The thickness of this aluminide layer may vary but is preferably from 5 microns to about 1mm. This aluminide layer has a double function: firstly it enables the metal support to be protected against the deterioration of the said support and secondly it enables the layer of ceramic material to adhere which is deposited subsequently.

The use of the cementation process for depositing the aluminide is preferable since as soon as the aluminide layer reaches a thickness of 5 microns it provides a sufficient seal to effectively protect the underlying metal support.

The deposit and solid fixture of the aluminide layer on the metal support may prove difficult when the said support is stainless steel. In this particular case, the applicant for the patent has perfected a new process which allows both the formation of a highly adhesive layer on the support and, where necessary, the welding of various supports to each other in order to produce complex catalytic structures such as, in particular, those which will be described below.

This new process is as follows: the stainless steel support is covered with a nickel layer deposited in a known manner, by painting or electroplating for example. The product obtained is heated in a hydrogen atmosphere to a sufficiently high temperature and for sufficient time to cause a certain diffusion of the nickel within the steel support. At this stage of preparation, the parts may be placed in contact, one upon another, so as to obtain a solid weld, through heat and pressure, and arrive at a complex structure. The parts may be welded to each other by heating the nickeled parts in a neutral gas or in a vacuum. The supports covered in nickel or the complex welded structures are then treated by cementation in a mixture comprising essentially a nickel aluminide and alumina. A particularly adhesive covering of nickel aluminide is then formed on the stainless steel.

The aluminide layer, preferably a nickel or cobalt aluminide, is in its turn covered by a layer of $\alpha$-alumina. The essential function of this layer is to prevent any contact between the catalytic material and the metal part of the support; it also provides protection of the underlying layer. The thickness of this $\alpha$-alumina layer is at least 10 microns.

Compared with other ceramic materials that may be used to produce these same intermediate layers, α-alumina has substantial advantages since it is far more adhesive and stronger.

The deposit of this α-alumina layer may be affected by all the known processes. However, these known processes are not all equivalent and in particular they are not always usable having regard to the sometimes complicated structures that may be produced according to the invention.

It has been found that the aluminide layer already deposited frequently became covered, in cold or hot conditions, with a very thin film of alumina. The idea was then formed of using this film of alumina to act as seeds for the deposit of α-alumina by a process (similar to the BAYER process) using alkaline aluminate solutions during hydrolysis. This process is simple to put into effect and allows a hydrated alumina to be obtained which is then heated to over 980°C to obtain α-alumina.

The presence of alumina seeds on the aluminide plays an important part in the regular formation and adhesion of the α-alumina layer to the aluminide layer; if another ceramic compound, such as zirconia for example, was deposited in the place of the α-alumina, this beneficial effect would not be obtained.

The catalytic surface layer, formed of a metal of the platinoid family or of an oxide or of a sulfide of the metals in this family, may be deposited directly on the α alumina layer; however the specific surface area of this alumina is sometimes too small and it is preferable to use gamma or eta alumina as the real specific surface of the catalyst.

Thus, in one of the preferred modes of implementing the invention, there is deposited on the aluminide layer a first layer of α-alumina which is covered by a supplementary layer of gamma or eta alumina, called hereafter "active" microporous oxide, with a specific area of between 100 and 400m$^2$/g.

The thickness of the α-alumina layer must be at least 10 microns; the thickness of the "active" oxide layer is between 10 and 25 microns, since beyond the 25 microns, this "active" oxide layer would have capillaries that would be relatively long in relation to their diameter, leading to a loss in the effectiveness of the catalyst, deposited subsequently, in relation to the mass of the said catalyst.

Finally the required catalyst or catalysts is, or are, deposited on this layer of ceramic material by known processes. Oxides or platinoides are deposited, for example, or derivatives of these platinoides, for example oxides or sulfides.

It is thus possible, for example, to deposit platinum by means of a sulforesinate solution.

Together, the processes described enable the various layers to be deposited on a ferrous or on a nonferrous metal support of a complex monobloc structure or form of previously welded parts, without using processes for depositing layers by blow-torch. The fact is that these torch processes would not enable a catalytic support of complex and monobloc shape to be covered in a uniform manner because of the shadow effect. Moreover, parts of a simple shape, already covered with alumina, would be very difficult to weld to each other in order to form a catalytic support of a complex shape.

The catalytic structures in accordance with the invention may have any macroscopic shape. Plates may be made that are flat or shaped to various profiles in order to form, for example, walls of pipes or of reactors. These plates may be solid or perforated to form grids. It is also possible to make wires and woven fabrics. Preferably, catalytic structures will be used which have been obtained from a thin expanded sheet, it being possible to assemble these structures in various known ways either before or after the thin expanded sheet is covered with the various deposits in accordance with the invention.

FIGS. 1, 2a and 2b, and 3a and 3b show examples of applications of the invention:

FIG. 1 shows:
at 1, the metal support
at 2, the metal aluminide layer
at 3, a layer of ceramic material which may be formed by compacted alumina,
and at 4, an active layer formed of gamma alumina on which platinum is deposited.

The advantages of the catalytic structures in accordance with the invention are essentially those arising from the use of a metal skeleton as a support for a catalytically active layer. These advantages include:
high calorific conductivity,
resistance to thermal shock,
resistance to mechanical shock,
suitability to being formed into highly varied shapes and to be reduced to very small thicknesses,
highly favorable mechanical strength/weight ratio. With metal grids, made in particular with expanded metal, it is possible to build solid catalytic structures which cannot be made with ceramic materials,
aptitude to absorb shock or momentary deformation as a result of to its elastic properties.

In addition one of the advantages of the structures made with expanded metal is that the surface of the channels offers roughness which causes turbulence in the gas and reduces the thickness of the boundary layer.

The following, non-limitative examples illustrate the invention:

EXAMPLE 1

Figure 1:
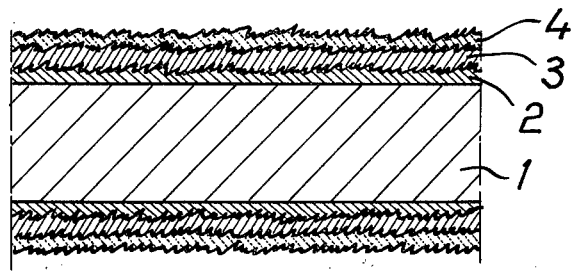
FIG. 1 shows in diagramatic form a section through an element of the catalytic structures in accordance with the invention.
Figures 2A, 2B:
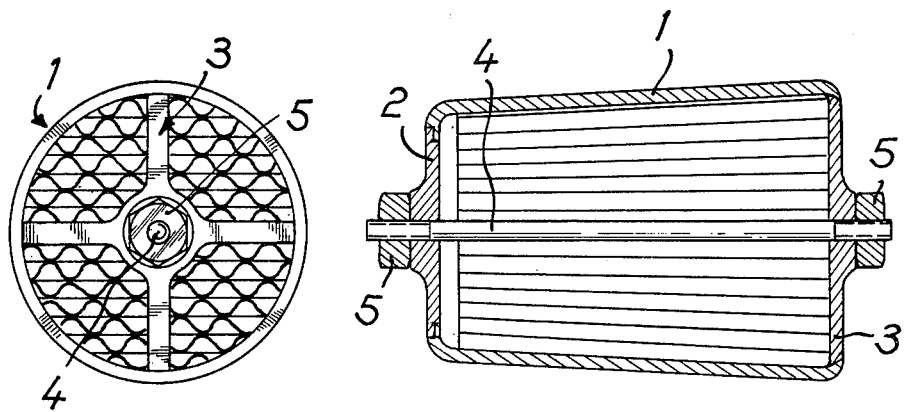
FIGS. 2a and 2b represent diagramatically a structure in accordance with the invention of the honeycomb type.

Making a catalytic structure, in accordance with the invention, of the honeycomb type (FIGS. 2a and 2b).

This catalytic structure is formed of a stack of thin sheets that are alternately flat and corrugated, treated in conformity to the process described above. These sheets are cut out in such a way that they all have the same length but variable widths so that the stack, seen from the front (FIG. 2a), describes a circle.

The various sheets making up the stack are not welded to one another. They are simply secured in an envelope 1 (FIG. 2b) which is a truncated cone by means of two spiders, 2 and 3, held together by threaded rod 4. Spider 2 bears on envelope 1 and the other spider bears on the stack. The tightening of nuts 5 thus clamps the stack in the truncated cone envelope. This assembly is possible because the stack has a certain elasticity.

The various flat and corrugated parts making up the stack are obtained as follows:

a. 18-8 austenitic stainless sheet, 0.1mm thick
b. deposit of nickel aluminide. The sheet is first degreased by means of solvents and then its surface is sand-blasted.

The aluminide is sprayed on by means of an oxyacetylene torch. It is supplied in the form of flexible "Nialide" beads by Societe pour la Fabrication d'Elements Catalytiques (SFEC) at Bolene.

Weight deposited on a plate measuring 1 dm$^2$: 0.4g or 0.2g on each face.

c. deposit of alumina.

The alumina is sprayed by means of the same torch as the nickel aluminide. The torch is fed with alumina in powder or rod form or, more conveniently, by means of flexible beads supplied by SFEC.

Weight deposited per dm$^2$ sheet, on each face: 1 g d. deposit of active alumina.

The plates are submerged in a solution of 1.45 M sodium aluminate at ambiant temperature. This is heated for 2 hours at 80°C and submersion is continued for 15 hours at ambiant temperature. The sodium aluminate decomposes on contact with the torch-sprayed alumina which is thus covered with hydrated alumina. The plates are then taken out of solution, washed to remove the sodium and allowed to dry for 2 hours at 120°C. They are then subjected to the following heat treatment:

temperature raised from ambiant to 400°C in 1 hour,
maintained at 400°C for 16 hours,
temperature raised from 400° to 500°C in 30 minutes,
maintained at 500°C for 1 hour,
cooled in 2 hours.

The quantity of active alumina deposited in this way is 1 g per dm$^2$.

e. platinum deposit.

The plates are submerged in a solution of platinum sulforesinate in an organic solvent. The amount of platinum in this solution is such that the quantity of platinum deposited on the plate is 7.5 mg per dm$^2$.

The plates, which retain a quantity of solution equal to 1.2 g per dm$^2$, are then allowed to drain, dried for 1 hour at 100°C and then baked for 20 minutes at 540°C.

The quantity of platinum deposited in this way is equal 0.25% of the total alumina deposited.

EXAMPLE 2

In this case the same arrangements are made as in Example 1 but solid corrugated sheet is replaced by sheet which also of stainless steel, but is expanded.

Initial thickness of expanded sheet: 0.2mm.
Dimension of largest diagonal of mesh: 3mm.
Width of linking metal 0.25mm.

As in example 1, the parts are covered, successively, with nickel aluminide, inactive alumina, active alumina and finally platinum.

EXAMPLE 3

The same arrangements are made as in examples 1 and 2, but only expanded metal is used, for both corrogated and flat parts.

For the corrugated parts the same expansion is used as in example 2. For the flat parts the expansion used has the following characteristics:

a thickness of sheet before expansion: 0.1mm.
dimension of the longest diagonal: 1.45mm.
width of linking metal 0.25mm.

EXAMPLE 4

Figure 3A:
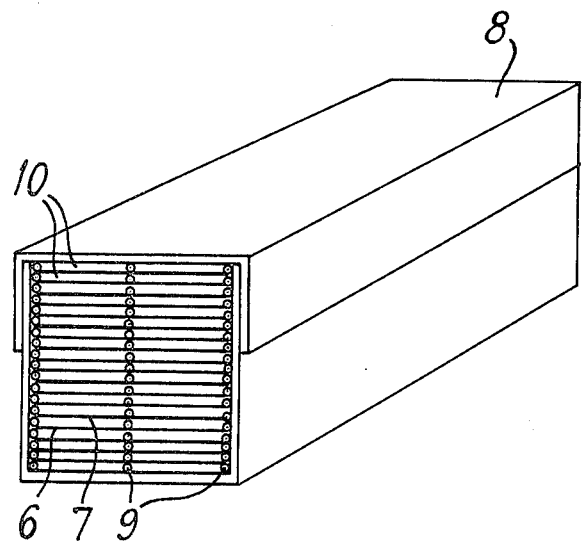
FIGS. 3a and 3b represent diagramatically a structure in accordance with the invention of the "multiple channel" type.
Figure 3B:
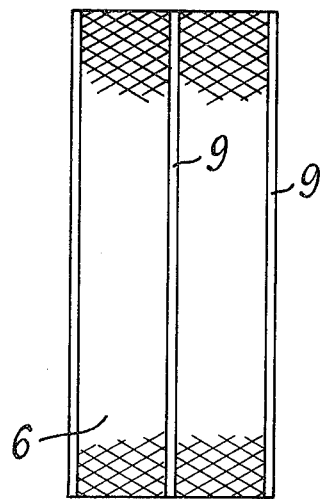

Making of a catalytic structure in accordance with the invention of the "multi-channel" type (FIGS. 3a and 3b).

In these figures it can be seen that this structure is formed of a stack of flat parts, possibly welded to one another, such as 6 and 7, enclosed within rigid structure 8.

These flat parts are held at a certain distance from each other by spacer wires 9, in such a way that rectangular section channels 10 are thus formed.

Each flat part measures 35 × 80 mm. The stack has 25 parts. The flat parts are of expanded Inconel with the following characteristics:

size of longest diagonal: 3mm.
width of metal filets: 0.34 mm.
thickness of sheet before expansion: 0.2 mm.
overall thickness of expanded sheet: 0.4 mm.

The spacer wires have a diameter of 1.2 mm. They are electrically welded to the expanded metal. The various parts are stacked or welded to each other by electrical welding along the generating lines of the cylinders formed by the spacer wires.

The free cross-section available for the passage of the fluid is about 62% of the total cross-section. For a block made up of 19 flat parts, the pressure drop for a gas at 315°C travelling at a spatial speed of 5000 volumes per hour is about 22mm of water.

a. deposit of aluminide layer.

A "cement" is prepared of the following composition:

nickel aluminide: 49% by weight
roast alumina (Pechiney PO20): 49% by weight
ammonium chloride: 2% by weight.

The nickel aluminide contains approximately 50% nickel and aluminium. Its particle diameter is under 125microns as are the particles of ammonium chloride.

The flat parts, separately or welded, are totally submerged in the cement contained in an Inconel pot. This pot is placed in an argon atmosphere furnace. It is heated to a temperature of 1100°C in 2 hours, this temperature then being maintained for 1 hour, after which it is allowed to cool. The thickness of the layer is 15 microns. The thickness of this layer may be modified by adjustments to temperature and treatment time.

After treatment in the cement, it is possible to carry out an additional treatment by diffusion in the absence of any source of aluminium, in a vacuum and in a neutral atmosphere. In this way the diffusion layer may be increased at the same time as its average aluminium concentration is reduced.

b. deposit of alumina layers.

After forming, where applicable, a thin layer of alumina on the aluminide by heating in an oxidizing atmosphere, the parts are submerged in a 1.5 molecular solution of sodium aluminate raised to 80°C. After one hour, the parts are placed in an identical solution, at ambiant temperature, where they are left for 16 to 20 hours. All the surfaces covered with nickel aluminide receive a layer of bayerite, $Al_2O_3,3H_2O$. The parts are then washed in water to remove the sodium. After drying in an oven, the parts are roasted for 1 hour at 1,000°C. The deposit is then 1 to 2 g of α-alumina per $dm^2$ of part. This α-alumina is suitable for receiving the deposit of the catalytic substance.

EXAMPLE 5

This repeats example 4 except for the fact that a fresh deposit of bayerite is applied to the layer of α-alumina before depositing a catalytic substance. The bayerite layer is cooked for one hour at 800°C. This produces a deposit of 1 to 2 g of gamma alumina per $dm^2$ of part. The specific surface area of the layer of gamma alumina, measured by means of nitrogen adsorption isothermes (Brunauer, Emmet, Teller method) is about 240 $m^2/g$. The average radius of the pores measured by mercury penetration is 40A. A catalytic substance such as platina, is dispersed in the gamma alumina layer by known processes.

EXAMPLE 6

This example describes a process for making a catalytic structure similar to that described in example 4.

The flat parts equipped with welded wires are of expanded 18-8 austenitic steel. A coat of metal paint is applied to the separate parts.

The quantity of nickel deposited on the 29 parts which are to form a multi-channel body of the type shown in example 4 with welded 1.1mm diameter wires is about 15 g. This weight corresponds roughly to a surface density of 0.5 g $1dm^2$. Satisfactory results are obtained for densities ranging from 0.25 to 2.5 $g/dm^2$.

After drying, the parts are stacked and then subjected to 2 hours treatment at 1,000°C in purified hydrogen.

A nickel diffusion is produced in the stainless steel at the same time as the parts are welded to each other.

The aluminium diffusion treatment is effected in cement of the following analysis by weight:

| | |
|---|---|
| aluminide NiAl | 49% |
| iron | 2 |
| chrome | 2 |
| alumina | 45 |
| ammonium chloride | 2 |

The aluminide, alumina and ammonium chloride have the same particle size as in example 5. The iron and chrome are in powder form passing wholly through a 63 micron mesh screen.

The heat treatment lasts 2 hours at 1,150°C. The aluminide layers that are formed have similar characteristics to those obtained on Inconel in example 4.

The alumina deposits are effected in accordance with one or other of the processes described in the previous example.

EXAMPLE 7

This example describes the catalytic effectiveness and resistance to shock of a catalytic structure made according to the process described in example 5 and having 25 flat parts in which a total 0.3 g of platinum has been deposited.

A gas is made to pass through this structure having the following analysis by volume:
CO: 1.45%
NO: 0.21%
$C_3H_8$: 190 ppm
$CO_2$: 13.5%
$O_2$: 1.45%
$N_2$: 83.39%

The flow rate is 50 000 volumes per hour.

The gas is heated to an increasing temperature. The temperature of the catalyst is noted and the CO content of the effluent gas is metered as it leaves.

Catalytic effectiveness is measured in terms of:
maximum effeciency of conversion from CO to $CO_2$, which should be as high as possible,
the temperature for which the effeciency is 90%,
the temperature corresponding to maximum effeciency.

The findings are as follows:
maximum effeciency: 98%
temperature for 90% effeciency: 352°C
temperature for maximum effeciency: 370°C.

In order to measure resistance to shock, the 25 parts are set in the rigid Inconel block as shown in FIG. 3a.

The block and its contents are then mounted in an envelope similar to that fitted to motor vehicles: elastic metal mattresses are inserted between the envelope and the rigid block. The shocks are produced by dropping the assembly described above onto a steel plate from a known height. The force of the shock is 0.045 kgm. The assembly is dropped 775 times, i.e. 37.5 kgm; after this treatment the structure in accordance with the invention is found to have suffered no loss of material and retains intact its catalytic effectiveness.

It is therefore surprisingly noted that:
as a result of a synergistic effect between structure and catalytic deposit, the catalytic effectiveness of catalysts obtained with structures made in accordance with the invention is higher than that of the same catalytic deposits applied to known structures:
resistance to shock and to vibration of metallic/ceramic structures in accordance with the invention is superior to that of known structures.
the above advantages are acquired without the resistance offered to the passage of fluids being higher than that of the best known catalytic structures.

I claim:

1. A multi-layered supported catalyst comprising a metal or metal alloy support, said support covered, at least partially, by a layer of at least one metal aluminide, wherein the metal of said metal aluminide is selected from the group consisting of cobalt, nickel, iron, chromium and mixtures thereof; said metal aluminide layer covered with a layer of α-alumina at least 10 microns thick and said α-alumina layer supporting a catalytic surface layer of a metal, metal oxide or metal sulfide, wherein said metal of said catalytic surface layer is a metal selected from the platinoid family or mixtures thereof.

2. The catalyst of claim 1 wherein the metal or metal alloy support is selected from the group consisting of iron, steel, ferronickels, nickel, chromium-nickels, ferritics, austenitics, stainless steels, cobalt-chromium and cobalt-nickel-chromium alloys.

3. The catalyst of claim 1 wherein the metal aluminide layer has a thickness of from 5 microns to about 1 mm.

4. The catalyst of claim 1 wherein a layer of gamma or eta alumina having a specific area of between 100 and 400 meters$^2$ per gram is disposed over said $\alpha$-alumina layer and supports said catalytic surface layer.

5. The catalyst of claim 4 wherein said active oxide layer is from 10 to 25 microns thick.

6. The catalyst of claim 1 wherein the metal aluminide layer is a nickel or cobalt aluminide having a thickness of from 5 microns to about 1 mm, and having a layer of gamma or eta type alumina deposited over said $\alpha$-alumina layer and supporting said catalytic surface layer.

7. The catalyst of claim 6 wherein said gamma or eta type alumina layer has a thickness of from 10 to 25 microns.

8. A catalytic structure comprising a stack of the catalysts of claim 1 within a rigid block, and the support of said catalyst being flat parts made of metal or expanded metal alloy.

9. A process for making the multi-layered supported catalyst of claim 1 which comprises depositing the metal aluminide on said metal or metal alloy support by contacting and heating said support with a cement containing nickel aluminide and alumina, depositing an $\alpha$-alumina layer on said aluminide layer by contacting said aluminide layer with a solution of an alkaline aluminate to form a layer of hydrated alumina thereon, removing said layer from said solution and heating said hydrated alumina layer to above 980° C to convert said hydrated alumina into $\alpha$-alumina, and depositing said catalytic surface layer thereon.

10. The process of claim 9, which further comprises depositing a layer of gamma alumina on said $\alpha$-alumina layer before depositing said catalytic surface layer thereon by contacting said $\alpha$-alumina layer with a solution of an alkaline aluminate to form a layer of hydrated alumina thereon, removing said layer containing said hydrated alumina from said solution and applying heating to about 800°C to convert said hydrated alumina to gamma alumina.

11. The process of claim 10 wherein a thin layer of alumina is formed on said metal aluminide layer before depositing said layer of $\alpha$-alumina thereon by heating said metal aluminide layer in the presence of an oxidizing atmosphere.

12. The process of claim 9 wherein the metal alloy support is stainless steel which is covered prior to forming said metal aluminide layer thereon with a nickel layer and heating said nickel covered stainless steel in a hydrogen atmosphere to diffuse said nickel into the stainless steel support.

13. A process for preparing a catalyst structure containing a plurality of stack spaced layered supported catalysts, each of said catalysts having a support of expanded stainless steel, coated with a layer of at least one metal aluminide of nickel or cobalt having a thickness of from 5 microns to about 1 mm, said aluminide layer having a coating of $\alpha$-alumina at least 10 microns thick, said $\alpha$-alumina having a coating of an active layer of eta or gamma alumina and at least one catalytic layer thereon, comprising coating expanded stainless steel supports with a layer of nickel, assembling said nickel covered stainless steel supports into a stack with a spacing weld wire between each support, heating the assembled supports in a hydrogen atmosphere to diffuse said nickel therein and weld said assembly together, depositing a metal aluminide layer on said supports by contacting and heating said support with a cement containing nickel aluminide and alumina, depositing an $\alpha$-alumina layer on said aluminide layer by contacting said aluminide layer with a solution of an alkaline aluminate to form a layer of hydrated alumina thereon, removing said layer from said solution and applying heating to above 980°C to convert said hydrated alumina into $\alpha$-alumina, repeating said treatment with said alkaline aluminate and heating to a temperature of about 800°C to produce a layer of gamma alumina, and depositing a catalytic surface layer thereon.

14. The process of claim 9 wherein the metal alloy is Inconel.

15. The process of claim 13 wherein the assembled supports are welded together by heating in a neutral gas or in a vacuum.

* * * * *